May 4, 1926.
B. W. FLANDERS
1,583,225
LICENSE HOLDER AND KEY CASE
Filed Oct. 4, 1924    2 Sheets-Sheet 1
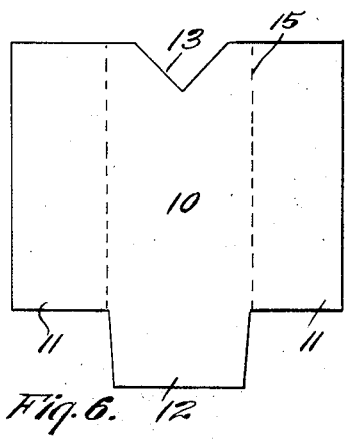
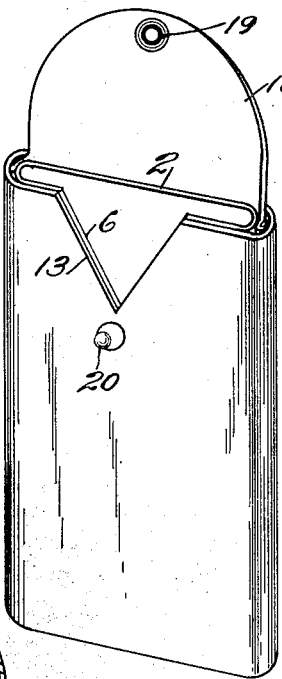
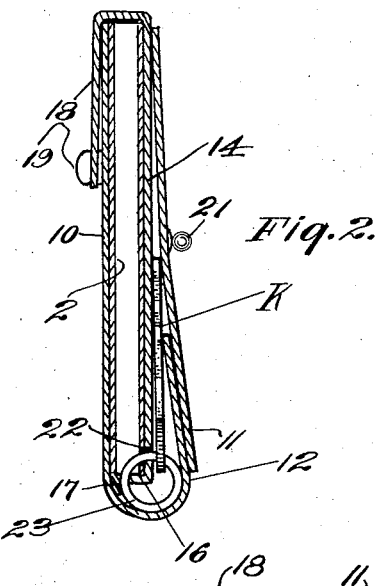
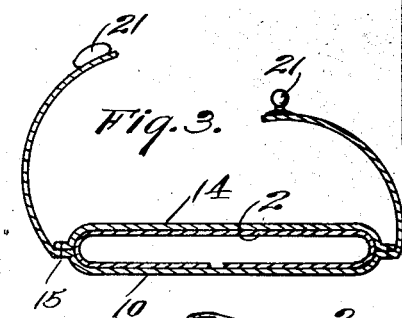
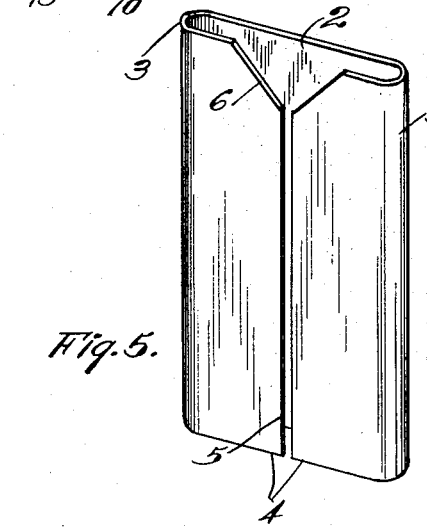
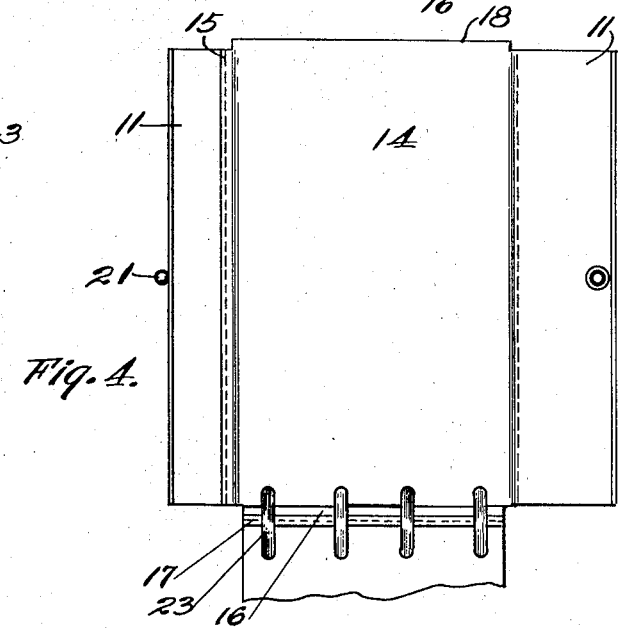
Inventor:
Bert W. Flanders,
By G. E. Maynard.

May 4, 1926.

B. W. FLANDERS

LICENSE HOLDER AND KEY CASE

Filed Oct. 4, 1924

2 Sheets-Sheet 2

Inventor:
Bert W. Flanders,
By G. E. Maynard.
his atty.

Patented May 4, 1926.

1,583,225

UNITED STATES PATENT OFFICE.

BERT W. FLANDERS, OF LOMITA, CALIFORNIA.

LICENSE HOLDER AND KEY CASE.

Application filed October 4, 1924. Serial No. 741,599.

*To all whom it may concern:*

Be it known that I, BERT W. FLANDERS, a citizen of the United States, and resident of Lomita, county of Los Angeles, State of California, have invented new and useful Improvements in a License Holder and Key Case, of which the following is a specification.

This invention relates to safes and particularly to a trouser pocket box for the safe keeping of a motor vehicle driver's license together with his motor or vehicle lock key or keys.

An object of the invention is to provide a combination safe keeping means for associately keeping a driver's license car and his motor or other key so as to insure the driver of being physically possessed of his license whenever he has occasion to unlock his vehicle or its motor, and so to practically eliminate driving of the vehicle without having then in his possession his legal license to drive.

A driver, being found without his license, is subject not only to an embarrassing "call down" but to fine and sentence also and my present invention has for an object to provide a simple, practicable and inexpensive means for safely retaining the license and the car lock key or keys in such convenient and associated relation as to preclude the possibility that the license will not always be at hand with the lock key of the vehicle, whether ignition, theft, or garage key lock.

The invention, therefore, consists broadly of a combined key and license safe or holder, preferably of a type to be carried in a trouser pocket without bending, crumpling or other mutilation of the, usually paper, license.

Further objects and advantages will be made manifest in the following specification of apparatus of my invention, one embodiment of which is illustrated in the accompanying drawing; it being understood that other modifications, variations and adaptations may be resorted to within the spirit of the invention and the scope thereof as here claimed.

Figure 7:
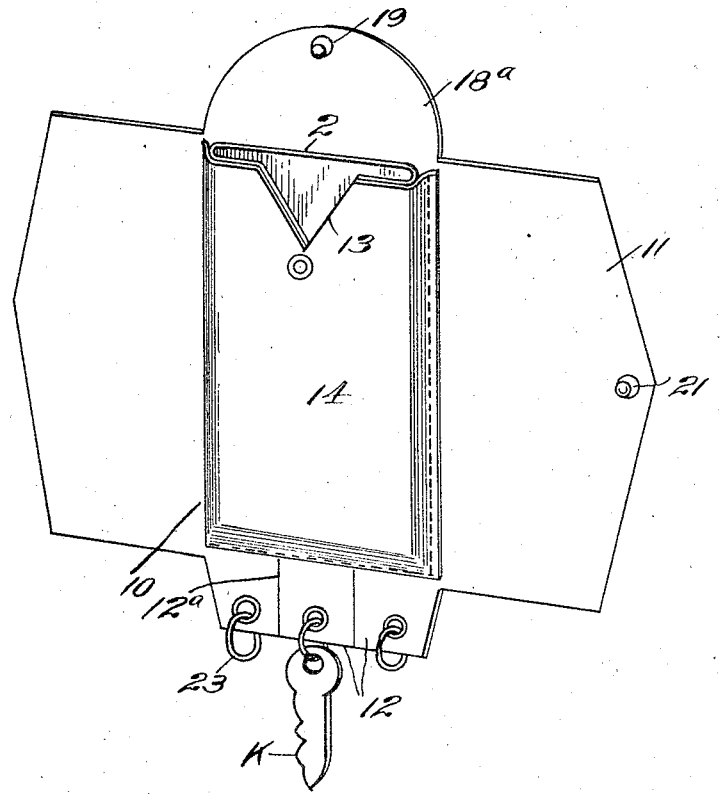
Figure 8:
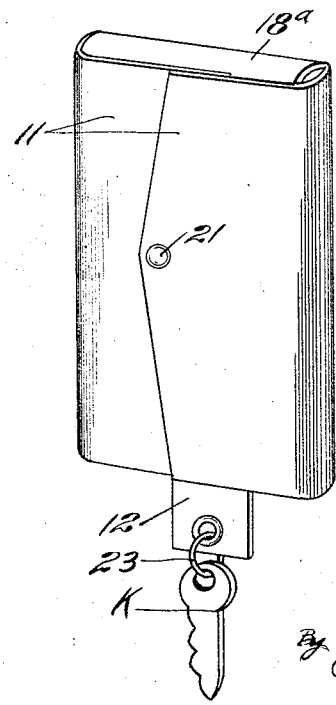

Figure 1 is a perspective showing the license pocket of the safe. Figure 2 is a vertical section of the safe, the flaps being closed. Figure 3 is a transverse section, showing side flaps open. Figure 4 is a back view of the safe. Figure 5 is a perspective of the detached cell of the safe. Figure 6 is a plan of a blank for cover part. Figures 7 and 8 are perspectives of a variant form of the safe.

An object is to provide a combined key and license safe of durable construction and which will, at the same time, embody rigidity and lightness as desirable features.

The drawings illustrate the device on about a full size scale, the safe being, in practice, about 3" by 1¾" by ½", though these dimensions may vary.

To obtain durability and rigidity the safe includes a sheet metal cell 2 inexpensively formed from flat stock bent along its sides to form narrow webs 3 having inturned flanges 4 nearly meeting at their edges 5 medially of the cell. Thus is formed a flat or narrow chamber having an open mouth at its top end for insertion of a sufficiently folded driver's license card or sheet, not shown. Corners of the flanges 4 are cut away at 6 on divergent lines to form a finger hole to facilitate extraction of contents of the cell.

Enveloping the cell is a cover of suitable material as leather or a fabric. The cover may be of various cuts of patterns or blanks, as desired, and here comprises a main blank, Fig. 6, having a front panel 10 with lateral flaps 11 and a bottom tongue 12. The upper end of the panel 10 is indented or notched at 13 to conform to the finger notch in the cell. To complete the cover another, or back, piece 14 is stitched along parallel lines 15 to the panel 10 to fit close around the cell. At the lower end of the back 14 is a narrow strip 16 stitched along line 17 at the fold of the bottom tongue 12. This strip 16 thus closes the bottom of the cover pocket. At the top of the back 14 is a covering flap 18 with a snap or other fastener 19 to engage a complementary part 20 on the front panel 10.

The flaps 11 are provided with fastener parts 21 to hold them in overlapped position over key or keys K, provision for attachment of which is here made.

As shown, the shell back is perforated at 22 near its lower edge and in the perforations are suitable key rings or loops 23 which also pass through the bottom 16. Keys applied to the loops 23 can be laid flat against the back 14, the bottom tongue laid around the rings or loops 23 and over the keys, and then the holding flaps 11 can be closed over the back to cover all and be fastened closed.

Thus the cell forms a rigid pocket for the inserted license and also carries means for attachment of the keys. The safe is a container for driver's license and his car keys, to keep them, for practical purposes, inseparable. Having use for the key or keys, the driver is sure to have his or her license along with the keys.

In Figures 7 and 8 the side flaps 11 and panel 10 are cut in one piece with a top tongue 18ª together with the bottom tongue 12. In this variant the tongue 12 is split at 12ª to form separate parts for keys. The panel 14 is stitched along its side and bottom edges to the panel 10 to form the pocket for the cell 2. Thus any of the key tongue parts 12 may be left pendent and the others thrown up over the panel 14 to be covered by the inturned flaps 11, Fig. 8. This avoids the opening of flaps 11 at each use of a given key, which may be left pendent and uncovered by the case flaps.

What is claimed is:

1. A pocket safe for vehicle driver's license, comprising a main casing including a central panel having side flaps to overlap and fasten on each other, an inside back piece secured to the panel within the sidelines of fold of the flaps and forming an open top chamber, a tongue on the top end of the casing and fastenable down over the top of said chamber and onto said back piece, and a back-bone forming cell in the chamber for receiving and protecting the license and prevent crumpling of the casing; the top of said cell and the top of the said back piece being cut away to form a finger hole for access.

2. A pocket key case having a stiff walled cell forming a back-bone to prevent crumpling of the case while carried in an apparel pocket; said cell being adapted to receive a vehicle driver's license card and to protect it from crumpling and also from wear and disfiguration by friction of compressed wall surfaces, and a tongue flap to close the open end of the cell and prevent the license from slipping out.

3. A pocket key case having a stiff walled cell forming a back-bone to prevent crumpling of the case while carried in an apparel pocket and forming a chamber to loosely receive a driver's license; said cell consisting of a piece of sheet metal having sides bent over and spaced from its back plate, the upper corners of the folded sides being cut off to provide a finger hole for access to the license.

BERT W. FLANDERS.